(12) United States Patent
Relis et al.

(10) Patent No.: US 8,964,728 B2
(45) Date of Patent: Feb. 24, 2015

(54) OPTIMIZATION OF CONSOLIDATING ENTITIES

(75) Inventors: Jerome Relis, Monsey, NY (US); Moshe Gutman, Spring Valley, NY (US)

(73) Assignee: IDT Corporation, Newark, NJ (US)

( * ) Notice: Subject to any disclaimer, the term of this patent is extended or adjusted under 35 U.S.C. 154(b) by 881 days.

(21) Appl. No.: 12/745,476

(22) PCT Filed: Nov. 30, 2007

(86) PCT No.: PCT/US2007/086194
§ 371 (c)(1),
(2), (4) Date: Jan. 24, 2011

(87) PCT Pub. No.: WO2009/070178
PCT Pub. Date: Jun. 4, 2009

(65) Prior Publication Data
US 2011/0116494 A1 May 19, 2011

(51) Int. Cl.
*H04L 12/66* (2006.01)
*H04L 12/12* (2006.01)

(52) U.S. Cl.
CPC *H04L 12/12* (2013.01); *Y02B 60/34* (2013.01)
USPC .......... 370/352; 370/331; 370/328; 370/338; 455/456.1; 455/456.5; 455/67.11; 455/405; 455/408

(58) Field of Classification Search
USPC ............ 370/331, 328, 338; 455/456.1, 456.5, 455/67.11, 405, 408
See application file for complete search history.

(56) References Cited

U.S. PATENT DOCUMENTS

| | | | |
|---|---|---|---|
| 6,463,270 B1 * | 10/2002 | Chang et al. ................. | 455/403 |
| 2002/0173310 A1 * | 11/2002 | Ebata et al. .................. | 455/445 |
| 2004/0153708 A1 | 8/2004 | Joshi et al. | |
| 2005/0024265 A1 * | 2/2005 | Stilp et al. ................... | 342/465 |
| 2005/0043037 A1 * | 2/2005 | Ioppe et al. ................. | 455/456.1 |
| 2005/0164712 A1 * | 7/2005 | Kennedy et al. ............ | 455/456.1 |
| 2006/0014543 A1 * | 1/2006 | Drakos ........................ | 455/450 |
| 2006/0206586 A1 * | 9/2006 | Ling et al. ................... | 709/219 |
| 2006/0268793 A1 | 11/2006 | Zanaty | |
| 2006/0276140 A1 * | 12/2006 | Austin et al. ............... | 455/67.11 |
| 2007/0008894 A1 | 1/2007 | Lynch et al. | |

(Continued)

FOREIGN PATENT DOCUMENTS

WO 2007/136511 11/2007

OTHER PUBLICATIONS

International Search Report dated Aug. 27, 2008 based on International Patent Application No. PCT/US07/86194.

(Continued)

*Primary Examiner* — Khaled Kassim
(74) *Attorney, Agent, or Firm* — Ohlandt, Greeley, Ruggiero & Perle LLP

(57) ABSTRACT

A system and method for homogeneously merging locations in a telecommunications network including: calculating a characteristic of a carrier at a first location and a second location; determining a penalty for excluding the carrier based in part on the characteristic; comparing the penalty determined to a preselected value; and, if the penalty is less than the preselected value, merging the first location and the second location, thereby forming a merged location.

24 Claims, 19 Drawing Sheets

(56) References Cited

U.S. PATENT DOCUMENTS

| | | | |
|---|---|---|---|
| 2007/0167150 A1* | 7/2007 | Hutcheson | 455/405 |
| 2008/0008130 A1* | 1/2008 | Haga et al. | 370/331 |
| 2008/0102872 A1* | 5/2008 | Liu | 455/522 |
| 2009/0005061 A1* | 1/2009 | Ward et al. | 455/456.1 |

OTHER PUBLICATIONS

J. T. Fox, "Consolidation in the Wireless Industry," Working Paper #05-13, NET Institute (http://www.NETinst.org), Nov. 5, 2005, Sec. 1.

* cited by examiner

CAPACITIES C1 = 100, C2 = 80, C3 = 60
LOCATION DEMANDS DL1 60, DL2 40, DL3 90, DL4 50

RATES

|    | L1  | L2  | L3  | L4  |
|----|-----|-----|-----|-----|
| C1 | .02 | .09 | .12 | .07 |
| C2 | .04 | .11 | .14 | .10 |
| C3 | .06 | .07 | .08 | .11 |

FIGURE 11

CARRIER ORDERED BY RATE

|    | L1 | L2 | L3 | L4 |
|----|----|----|----|----|
| C1 | 1  | 2  | 2  | 1  |
| C2 | 2  | 3  | 3  | 2  |
| C3 | 3  | 1  | 1  | 3  |

FIGURE 12

CARRIER WEIGHTED BY AVAILABLE CAPACITY UP TO INCLUDING CARRIER AT LOCATION $WC_{ij} = CapC_{ij}/\Sigma CapC_{kj}$ WHERE $OC_{kj} <= OC_{ij}$ $TWC_i = \Sigma WC_{ij}$ $TLWC_i = \Sigma(DL_j * WC_{ij})$

|     | L1     | L2      | L3      | L4     | TWCi | TLWCi |
|-----|--------|---------|---------|--------|------|-------|
| TC1 | 1      | 100/160 | 100/160 | 1      | 3.1  | 185   |
| C2  | 80/180 | 80/240  | 80/240  | 80/180 | 1.7  | 98    |
| C3  | 60/240 | 1       | 1       | 60/240 | 2.5  | 157.5 |

FIGURE 13

CAPACITY DISTRIBUTED BY (DLj * WCij/TLWCi) * CapCij

| | L1 | L2 | L3 | L4 | TWCi |
|---|---|---|---|---|---|
| C1 | 32 | 13 | 27 | 28 | .51 |
| C2 | 24 | 7 | 18 | 21 | 80/100 |
| C3 | 4 | 18 | 42 | 1 | 60/240 |

FIGURE 14

$TWCi = \Sigma DLj * WCij/\Sigma DLj$
L1' = 60 - 55 = 5  L2' = 40 - 18 = 22  L3' = 90 - 42 = 48  L4' = 50 - 44 = 6
$CLCij = (DLj/\Sigma DLk) * CapCi$ WHERE Wcij = 1

| | L1 | L2 | L3 | L4 | TWCi |
|---|---|---|---|---|---|
| C1 | 55 | 100/180 | 100/180 | 44 | .51 |
| C2 | 80/100 | 80/240 | 80/240 | 80/100 | 80/100 |
| C3 | 60/240 | 18 | 42 | 60/240 | 60/240 |

FIGURE 15

$CLCij' = (DLj')/\Sigma DLk * CapCi$ WHERE Wcij <= 2
$TWCi = \Sigma DLj * WCij/\Sigma DLj$

| | L1 | L2 | L3 | L4 | TWCi |
|---|---|---|---|---|---|
| C1 | 60 | 100/180 | 100/180 | 50 | .51 |
| C2 | 80/100 | 80/240 | 80/240 | 80/100 | 80/100 |
| C3 | 60/240 | 40 | 90 | 60/240 | 60/240 |

ACL2 = (.09 * 100 + .11 * 80 + .07 * 60)/240 = 22/240 = .091
ACL3 = (.12 * 100 + .14 * 80 + .08 * 60)/240 = 28/240 = .12
ACL4 = (.07 * 100 + .10 * 80 + .11 * 60)/240 = 22/240 = .087

FIGURE 16

DIFFERENTIAL FROM AVERAGE WEIGHTED COST
$D_{ij} = ACLi/RATE_{ij}$
$AvgCiW = \Sigma D_{ij} * DL_j / \Sigma DL_j$

|    | L1  | L2  | L3  | L4   | AvgCiW |
|----|-----|-----|-----|------|--------|
| C1 | 1.8 | 1.1 | 1   | 1.25 | 5.15   |
| C2 | .9  | .83 | .9  | .87  | 3.5    |
| C3 | .6  | 1.3 | 1.5 | .8   | 4.2    |

FIGURE 17

DEMAND DISTRIBUTION
$D_{ij}/TOTAL\ CiW * CapCi$
STARTING FROM HIGHEST $D_{ij}$ UNTIL CAPACITY FILLED

|    | L1 | L2 | L3 | L4 |
|----|----|----|----|----|
| C1 | 35 | 21 | 20 | 24 |
| C2 | 21 | 1  | 43 | 20 |
| C3 | 4  | 18 | 27 | 6  |

OPTIMIZATION OF CONSOLIDATING ENTITIES

CROSS-REFERENCE TO RELATED APPLICATIONS

This application may be related to International Application No. PCT/US2007/010356, filed Apr. 27, 2007, which claims the benefit of priority from U.S. Provisional Patent Application No. 60/801,453, filed May 18, 2006, and each entitled "Fast Network Heuristic for Traffic Flow Prediction", the contents of each of which are hereby incorporated by reference. This application may also be related to U.S. patent application Ser. No. 11/024,672, published as U.S. Patent Application Publication No. 2007/0008894, and entitled "Telecommunications-Based Link Monitoring System", the contents of which are hereby incorporated by reference.

FIELD OF THE INVENTION

The present invention is directed to a system and method related to efficient routing an/or optimizing (when presented with the opportunity to optimize) based on consolidating entities.

BACKGROUND OF THE INVENTION

Known telecommunications systems can utilize varying long-haul communications providers (e.g., carriers or links) when routing a telephone call from an originating point to a destination point. Such systems may include routing preferences based on cost to the telecommunications provider, for example, in order to maximize the telecommunications provider's profit on any given call.

For any given location, a number of carriers may provide differing levels of service at different price points. At times, calls are not routed in the most economically efficient manner by the telecommunications provider, as different carriers have different rates at different locations.

SUMMARY OF THE INVENTION

In light of the deficiencies of prior routing methods, a first non-limiting aspect of the invention provides a method for merging locations, where the method includes: calculating at least one first characteristic of at least one carrier at a first location and a second location; determining at least one penalty for excluding the at least one carrier based in part on the at least one first characteristic; comparing the at least one penalty determined to at least one preselected value; and, if the at least one penalty is less than the at least one preselected value, merging the at least one first location and the at least one second location, thereby forming at least one first merged location.

A second non-limiting aspect of the invention provides a system for merging locations, where the system includes: means for calculating at least one first characteristic of at least one carrier at a first location and at a second location; first means for determining at least one penalty for excluding the at least one carrier; means for comparing the at least one penalty to at least one preselected value; and, if the at least one penalty is less than the at least one preselected value, means for merging the at least one first location and the at least one second location, thereby forming at least one first merged location.

BRIEF DESCRIPTION OF THE DRAWINGS

FIGS. 11-18 illustrate exemplary results from the methods set forth in FIGS. 1-10;

DESCRIPTION OF THE EMBODIMENTS

Figure 1:
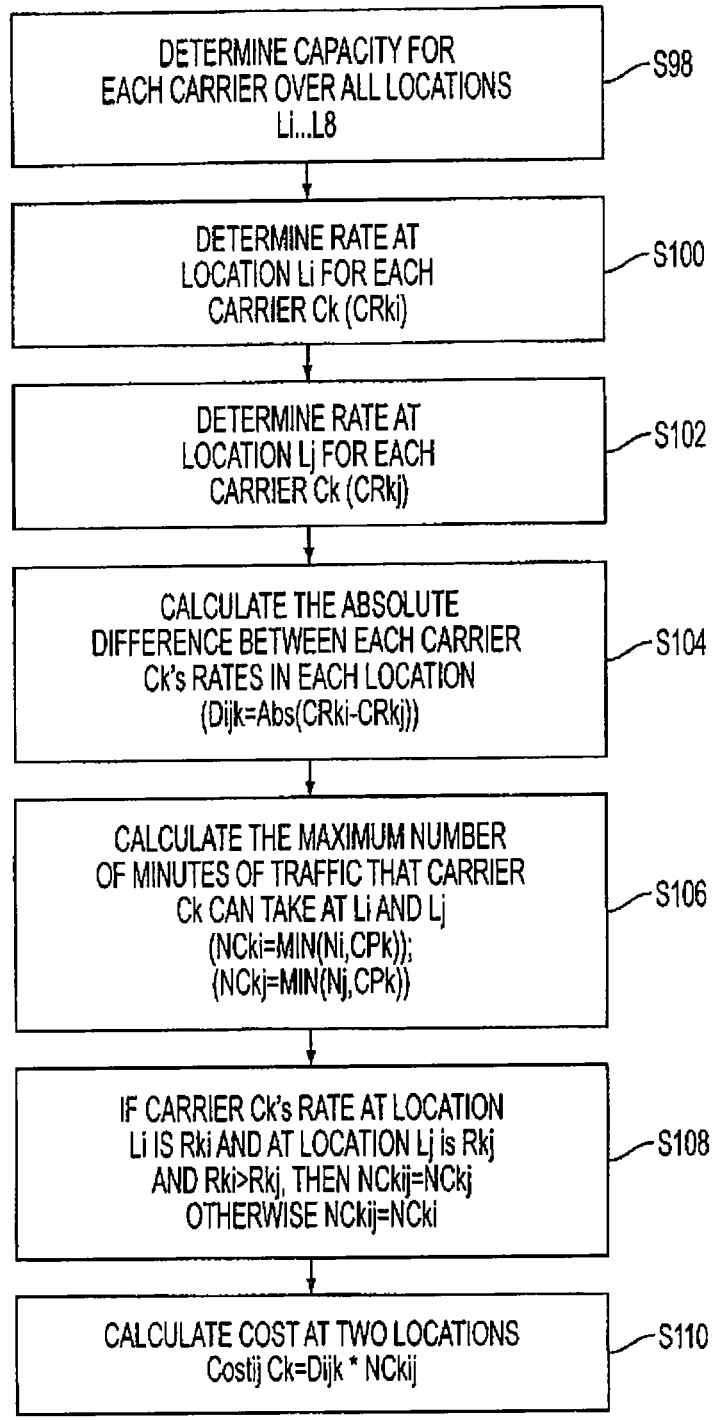
FIG. 1 illustrates exemplary method steps for calculating costs at two locations performed as a non-limiting aspect of the present invention.

Non-limiting embodiments of the present invention will be described below with reference to the accompanying drawings, wherein like reference numerals represent like elements throughout. The present invention is directed to a method, system, and apparatus for efficiently merging homogeneous locations. In the non-limiting examples described herein, a telephone network (e.g., a land line, cellular, Voice over Internet Protocol (VoIP), and/or tandem) is used to describe aspects of the invention. However, it should be understood that the techniques described herein are equally applicable to other types of networks.

As a non-limiting example, a homogenous location may be defined as the set of dial strings for which each individual carrier provides uniform rates. However, other factors, such as those discussed in more detail below may be used to define homogenous locations.

In the following non-limiting examples, a homogenous location may be defined at least in part based at least in part on a set of dial strings. For each dial string, it may be desirable that each carrier gives a rate to a location, and each carrier's rate is the same for each dial string in the location (e.g., carrier A charges 3 cents to each string; carrier B charges 2.5 cents to each string, etc.). This may be determined by looking over time windows, and may be considered within countries and/or within Local Access Transport Areas (LATAs). In this non-limiting example, LATA stands for Local Access Transport Areas and, in the United States, there are approximately 203 LATAs. LATAs may overlap area codes, and area codes may overlap LATAs. At times, it may be preferable to route within LATAs. Also, although LATAs are used in the following examples, it will be understood that other geographic divisions are within the scope of the invention (especially in the context of international routing). It may also be possible to consider the quality of a carrier at a location, business desired, and quality issues across carriers when defining homogenous locations.

It may also be desirable to account for the impact of Regional Bell Operating Companies (RBOCS) when deciding whether or not to merge locations. Additionally, even within a particular location, there are different costs per Local Exchange Carrier (LEC). LECs are less regulated than the RBOCS, and may have varying costs. Every carrier may have a different cost structure that may impact the desirability of merging.

Additionally, Inter-Exchange Carriers (IXCs) deliver traffic to LECs. In this example, the system may terminate traffic at the IXCs for ultimate termination with the LECs. IXCs may mark up the costs of LEC terminations, and any mark up may be calculated into the cost of terminating traffic from the system to a LEC within a LATA. Mark ups may vary by IXC, as well as by the LEC to which the IXC routes the traffic. Accordingly, it may be desirable to look at these additional costs relative to the carriers that may be preferred for business criteria. Business criteria may include a level of required service, a relationship with the carrier, as well as minimum traffic agreements, as well as other factors that are known to those of skill in the art. Moreover, each LEC may have its own OCN (there may be a one to one relationship between OCNs and LECs, and the OCN may provide a numerical tag for the LEC).

Throughout the application, the term "carrier" is predominantly used for IXCs. However, other telephone carriers are also within the scope of the term "carrier" in this invention, as will be apparent to those of skill in the art.

Yet another factor that may be considered is the impact of Local Number Portability (LNP) on the merging process. LNP can be costly and difficult to manage, because the Local Exchange Routing Guide (LERG) (from which much of the carrier information may be obtained) is not always updated to reflect the carriers associated with particular ported numbers. Generally, the LERG provides the LEC associated with six or seven digits of the party being called. LNP affects the accuracy of the LERG because the LERG may incorrectly list a number as assigned to a carrier when it is no longer actually assigned to that carrier (for example, because the user of the phone number has transferred to another phone carrier).

For a situation where a LEC is not accurately identified in the LERG, there is another database (e.g., the Neustar database) that may include most, if not all, of the numbers that have been ported to another carrier. That data can then be used to override any information obtained from the LERG. Moreover, ten digit dial strings may be used in addition to the six digit dial strings and the seven digit dial strings in determining characteristics of a carrier. The dial strings and their portability (or previous porting) and/or any new rates due to porting may be used to create a weighted rate for these carriers in determining which carriers actually represent the best values.

In a system that can handle multiple layers of routing, interstate and intrastate traffic may be handled separately—using the intrastate rates for intrastate calls and the interstate rates for interstate calls. In systems that cannot handle multiple layers of routing, it may be desirable to take a blend of intrastate and interstate rates to determine the actual cost per carrier to account for intrastate routing. This is because at least some carriers have interstate and intrastate rates that may be different. This can be done at a six digit, a seven digit, or a ten digit level. It may be possible to assume that a percentage (e.g., based on historical information) of calls coming through a switch are being routed intrastate, rather than interstate.

As described above, a LATA is a high level designation and is geographic in nature. OCNs represent LECs that operate within a LATA. An OCN may be used in defining at least part of a homogenous location. However, some carriers define locations by LATA and OCN, while other carriers define locations by LATA, state, and OCN, and still other carriers use other methods for identifying locations. Because carriers are not alike and do not define locations in the same way, the system may compensate for these differences in definitions to develop homogenous locations. In simple terms, the carriers' definitions of locations may be accounted for and used by the system to identify homogenous locations. Of course, all of the factors described above represent just a few of the characteristics of the carriers that may be evaluated as part of the merging process.

Additionally, the type of LEC in a location may be used as a characteristic that may determine, at least in part, a homogenous location and/or the desirability of a particular merge. The type of LEC may be represented by the category of OCN (e.g., as identified in the LERG table) associated with the LEC.

In this non-limiting example, A represents an RBOC (e.g., one of the primary LECs in country); B represents an ICO (e.g., one of the incumbent LECs in certain areas of the country that have never been controlled by RBOCs, like Southern New England Telecom in LATA 920; Cincinnati Bell, GTE areas, Sprint, or United); C represents other non-RBOCs (e.g., CLECs which are competitive LECs that are not ILECs and that operate in areas that are already served by RBOCs and/or ILECs). In general, the costs are least at A and most at C, with B in between. Sometimes the rates can be double or more for C as compared to A.

In this non-limiting example, M represents mobile. M is different than A, B, and C due to the different regulations that govern terminations to mobile when compared to terminations to fixed lines. Any rates on mobile are charged based primarily on transport, rather than local tariffs, because mobile users pay for mobile service and there is therefore generally no additional terminal tariff. Mobile rates, as a result, are often less than A. Additionally, there may be areas where B (or A, C, or M) does not exist.

When a specific homogenous location does not provide enough value when compared to a location that would be preferred to keep, it may be preferred to merge. However, it may be desirable to not merge M or B with A, to maintain a separation for quality or to satisfy other business criteria. Therefore, a bias may be applied to merge an M with a C or a B with a C to maintain the separation. Toward the end of the merging process, M and B may be merged into other locations as a threshold value for maximum locations is approached. Of course, other biases based on other considerations are also within the scope of the present invention.

While the following explanation addresses specific factors, it is important to understand that a variety of other factors may also be useful to consider when efficiently merging. For example, useful factors may include, but are not limited to: a difference (if any) in rates for each carrier between two or more locations; a number of calls at each location to be merged; balancing traffic to the resulting routing locations; the capacities of each carrier; continuity between prior generations of routing locations and the current generation of routing locations; exclusion of carriers which cannot carry traffic to all dial strings in a location; and the quality of each carrier.

Referring to FIG. 1, exemplary aspects of a method according to the present invention will now be described. In this non-limiting example, the highest rate for a particular carrier to all dial strings in a routing location is used as the carrier's rate. However, it is also possible to use blended rates, an average rate, the lowest rate, or any other rate that may be desired. FIG. 1 refers to two locations: Li and Lj. For ease of calculations, the steps in this example may be performed using pairs of locations. However, other groupings for calculations are also within the scope of the present invention.

In step S98, shown in FIG. 1, the system may determine a capacity for each carrier over all locations Li . . . Lγ, where γ is a real number. In step S100 the rate CRki for each carrier Cki at location Li is determined, and in step S 102, the rate CRkj for each carrier Ckj at location Lj is determined. In step S 104, the absolute difference between each carrier Ck's rate in each location is calculated: (Dijk=Abs(CRki−CRkj)).

In this example, the number of minutes at location Li may be set to Ni and the number of minutes at Lj may be set to Nj. Next, in step S 106, the estimated number of minutes (CPk) of traffic that carrier Ck can take at Li and Lj is calculated. If carrier Ck's rate at location Li is Rki and at location Lj is Rkj, and Rki is greater than Rkj, then NCkij=NCkj in step S 108. Otherwise, NCKij=NCki in step S 108. In step S110, the cost at the two locations is calculated using the formula: CostijCk=Dijk*NCkij.

Alternatively, CPk may be calculated as an estimated minute capacity of carrier Ck over a desired time interval using the formula CPk=⅔*(number of lines for that carrier) *time duration. In this non-limiting example, ⅔ is used as a part of the formula as a general indicator of the quality of the carrier. In particular, by multiplying ⅔ (or another suitable factor) by the number of minutes that a carrier can handle, the formula can account for the non-billable minutes on each line, such as non-billable minutes required for call set up, lost calls, and other factors. On carriers that have higher quality, a factor such as ⅞ may be chosen. On carriers that have lower quality, the system may employ a factor such as ½. Of course, these ratios are merely exemplary and should not be considered limiting of the present invention. Other ratios known to those of skill in the art are within the scope of the present invention.

For simplicity, it is possible to assume that the time interval is an hour. The system may determine the number of maximum minutes NCki and NCkj that carrier Ck can take at locations Li and Lj, respectively. In other words, although the carrier Ck might have a capacity of CPk over the hour, the carrier might limit traffic at specific locations so that only NCki minutes may be permitted to terminate at location Li during the hour.

Another factor that may be considered as part of a non-limiting aspect of the present invention is the ability of carriers to limit traffic to specific locations. For example, although carrier Ck may have capacity of CPk over a time interval, the carrier might chose to limit traffic to that location and might only permit NCki minutes to terminate at location Li during the time interval.

Figure 2:
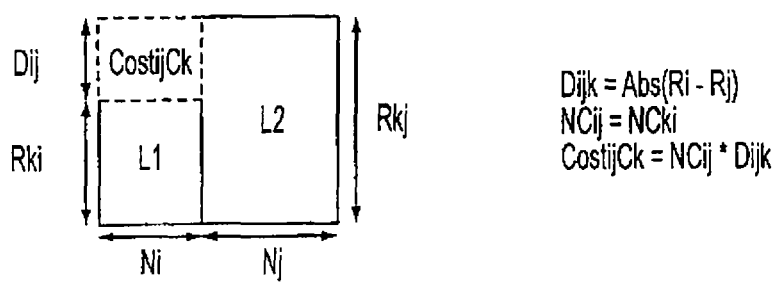
FIG. 2 provides a non-limiting illustration of CostijCk.

The result of step S110 provides an estimated differential for routing the lower cost calls for carrier Ck at the higher rate if the locations are merged. The result of step S110 may also provide a way to limit minute usage to the minimum of the capacity of the carrier or to the number of minutes used at the higher rate location, as desired. FIG. 2 illustrates the results of step S110. In this example, the cost (e.g., penalty) of the merge is considered to be the worst case scenario, since it represents the number of minutes that would have been routed at a cheaper rate if the merge had not been made. However, it is possible that, even after the merge, a carrier would still be the cheapest carrier and would still carry traffic at the original rate. As a result, it may be desirable to use a blended rate to have a more accurate calculation. Throughout the present specification, wherever an absolute rate change is described, a blended rate may be used instead.

Figure 3:
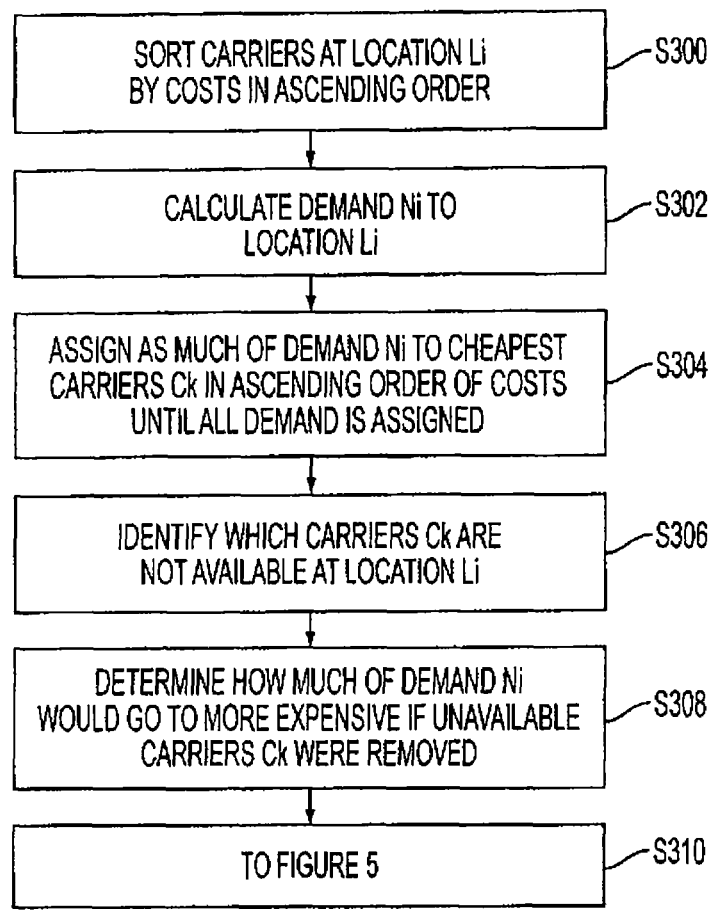
FIG. 3 illustrates exemplary method steps that may be used to determine the impact of removal of carriers from the merging process according to a non-limiting aspect of the present invention.
Figure 4:
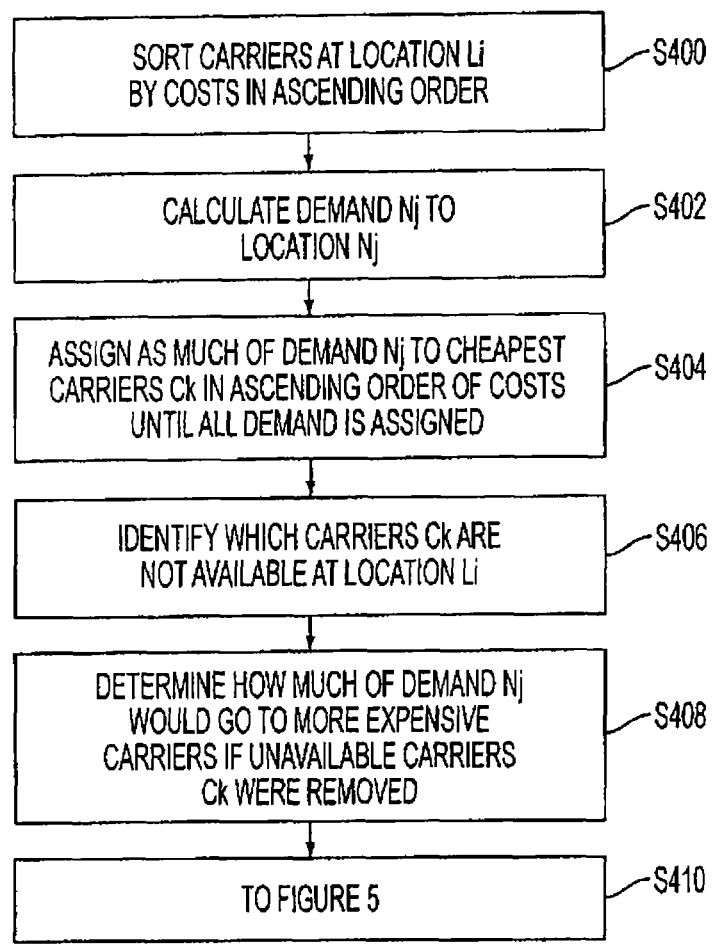
FIG. 4 illustrates additional exemplary method steps that may be used to determine the impact of removal of carriers from the merging process according to a non-limiting aspect of the present invention.

Sometimes, a carrier that is available at one location is not available at another location. As a result, it may be desirable to remove such carriers from the merging process. FIGS. 3 and 4 provide non-limiting examples for processing carriers and locations when some carriers are not available at both locations. The result of this elimination process may be referred to as the "penalty" for merging locations Li and Lj.

As shown in FIG. 3, carriers may be sorted at location Li in ascending costs order in step S300. In step S302, the demand Ni to location Li may be calculated. The demand to a location may be calculated using historical traffic analysis. For instance, it is possible to calculate the traffic to a location using a weekly average of traffic to the location during a specified time unit. This process is described in more detail in copending U.S. Published Application No. 2007/0008894, entitled Telecommunications-Based Link Monitoring System, the contents of which are incorporated by reference.

In step S304, demand Ni maybe recursively assigned to the least expensive carriers Ck in ascending order of costs until all demand is assigned. Generally, to minimize costs, it may be preferable to assign as much demand as possible to the cheapest carriers. However, it may be desirable to assume that not all of the capacity of the carrier may be used at a specific location, since that carrier most likely receives traffic at many locations.

In step S306, the system identifies which carriers Ck are not available at location Lj. Subsequently, in step S308, the system determines how much of demand Ni would be allocated to more expensive carriers if the carriers Ck unavailable at Lj were removed. In FIG. 4, steps S400-S408 repeat the process of steps S300-S308 for carriers at location Lj.

Figure 5:
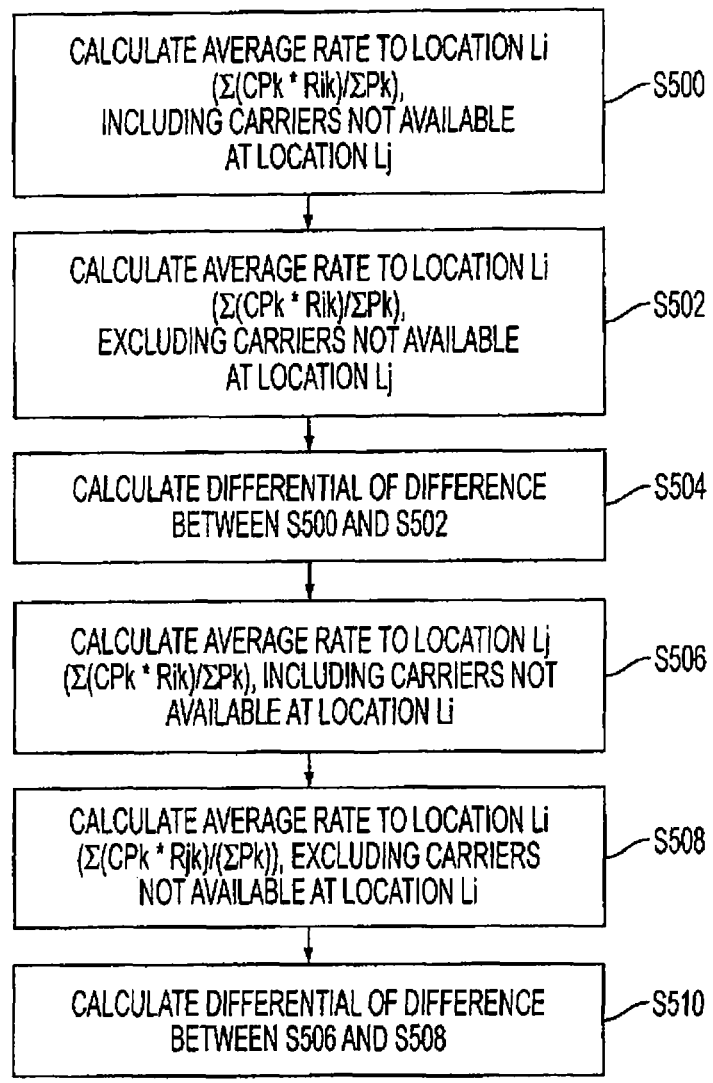
FIG. 5 illustrates additional exemplary method steps that may be used to calculate the impact of removing a carrier from the merging process according to a non-limiting aspect of the present invention.

At some point after the calculations in one or both of FIGS. 3 and 4 have been completed, the system moves to step S500, shown in FIG. 5. In step S500, the system calculates the average rate to location Li using: (Σ(CPk*Rik)/ΣPk), including carriers not available at location Lj. In step S502, the process is repeated: (Σ(CPk*Rik)/ΣPk), excluding carriers not available at location Lj. In step S504, the system may then calculate the differential of the difference between the results of S500 and S502. In steps S506-S510, the process is repeated for location Lj. The resulting differentials may be a lower bound on the penalty Eij for merging Li and Li. To obtain Eij, the system may add the values obtained in steps S504 and S510.

Figure 6:
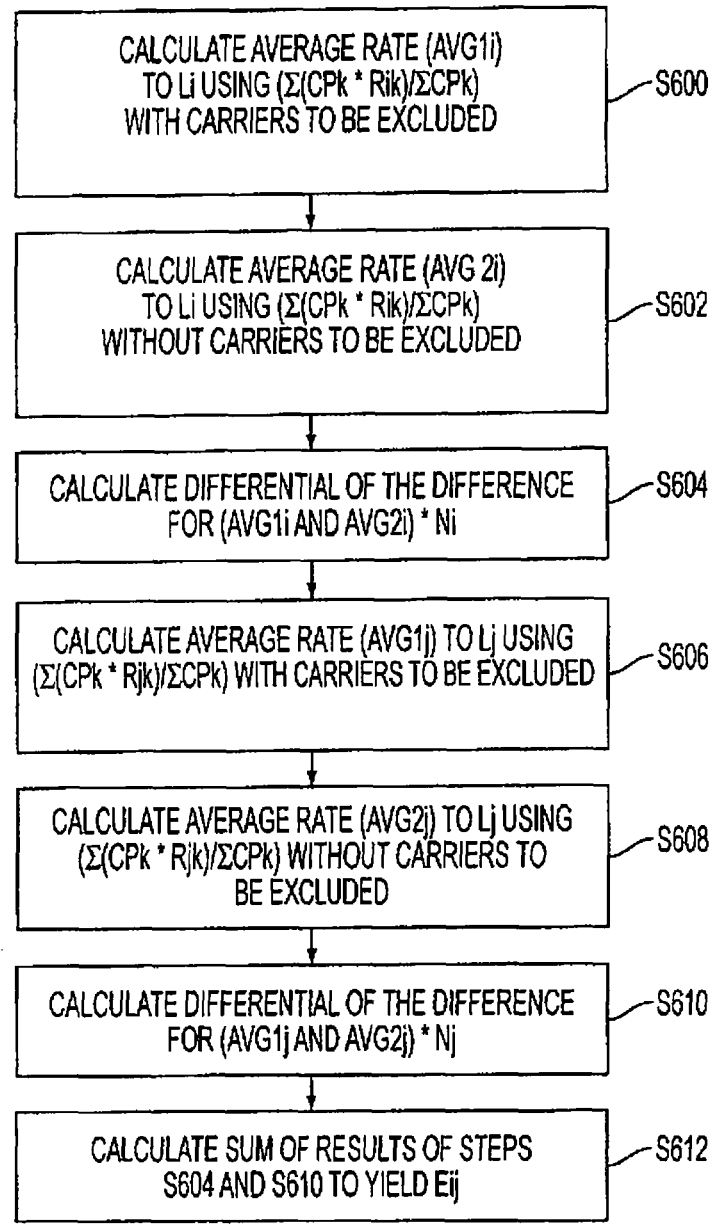
FIG. 6 illustrates additional exemplary method steps that may be used as part of a determination of the impact of removing a carrier from the merging process according to a non-limiting aspect of the present invention.

Alternatively, as shown in FIG. 6, it is possible to determine the penalty Eij another way. For example, in step S610, the system may calculate an average rate (AVGIi) to Li using the formula (Σ(CPk*Rik)/(ΣCPk), including carriers to be excluded. Then, in step S602, the system may calculate the average rate (AVG2i) to Li using (Σ(CPk*Rik)/(ΣCPk), not including carriers to be excluded. In step S604, the system may calculate a differential of the difference between these two averages multiplied by the amount of demand Ni at location i. In steps S606-S610, the process of steps S600-S604 may be repeated for location Lj. Subsequently, in step S612, the penalty Eij may be calculated by summing the results of steps S604 and S610.

As yet another non-limiting example, the penalty Eij may be calculated by combining the values for Eij obtained using the methods described in FIGS. 5 and 6. For example, Eij may be calculated using an average (weighted or unweighted) of the Eij of FIG. 5 and the Eij of FIG. 6. Of course, alternative methods of calculating the penalty Eij are also within the scope of the present invention.

The next step, after the penalty Eij has been calculated, is to calculate the total estimated differential after merging the two locations for routing at the higher rate over all carriers Ck. To do this, the system may apply the following formula: $TD_{ij}=WC_{ij}*\Sigma Cost_{ij}C_k+WE_{ij}*E_{ij}$.

In this non-limiting example, WCij and WEij may represent weights between 0 and 1. WCij and WEij may be used to reflect the relative impacts of removing carriers at different stages of merging. For example, it may be costlier to remove a carrier Ck at a later stage in the merging process when compared to an earlier stage in the merging process. Accordingly, WCij and WEij may also be adjusted to reflect the relative impacts of removal at different stages. These weights may be adjusted to account for any number of preferences. By way of non-limiting example, the weights may be used to account for desired quality, call completion ratio (CCR), billable duration, LATA relationship, the owner of the dial string, the owner of the last line in the series of dial string connection, ALOC, signaling, and/or discrepancies in quality, as well as other factors known to those of skill of the art.

As yet another non-limiting example, one preference may be to minimize the number of carriers Ck excluded in early stages of merging. This possible preference results from the fact that each carrier, once excluded, may remain excluded in subsequent merges. Although this example has been described with the idea that carriers, once excluded, remain excluded throughout the process, it is important to note that systems and methods in which carriers are reintroduced later in the merging process are also within the scope of the present invention.

Additionally, it may be possible to assign a rate to a carrier that would otherwise be excluded from the merging process. This rate may be slightly higher than the rate of at least some of the other carriers to that location, such that the rate accounts for the unavailability of that carrier at another location.

A non-limiting aspect of the present invention may enable a bias toward generating the same locations where possible. Therefore, if there is an equal cost for merging Li with Li or Li with Lk if Li and Lj had (in a prior iteration of the merging process) been merged, then it may be desirable to bias the merging toward remerging Li and Lj. This enables a more accurate comparison of results before and after new locations are created. Additionally, if rules have been generated for prior locations (e.g., a minimum standard of quality), the rules may be reapplied if that location can be regenerated.

If routing locations were previously generated (e.g., if at least a first round of merging has occurred between Li and Li), then Wij may equal 1. In this non-limiting example, the prior round of merging may have occurred before the last time a switch update or refresh was performed.

If Li and Lj have not previously been merged, Wij may be set equal to (1+p, where p has a value between 0 and 1). Experimentation may yield the best value of p. Generally, p represents the penalty for a previously untried merge. In developing a value for p, it may be desirable to consider the difference between merging to locations with the same cost of merging relative to merging two locations with different costs. Generally, any number greater than zero will work as a value for p. This enables a preference to be applied to a merge that has been merged previously, since a successful merging record has been achieved. In this case, TDij may be replaced by $TD_{ij}*W_{ij}$.

After the value for TDij has been calculated, the system then determines the number of distinct carriers at locations Li and Lj (NCTDij). In actuality, this calculation may be performed at any desired time before or during the process described above.

Figure 7:
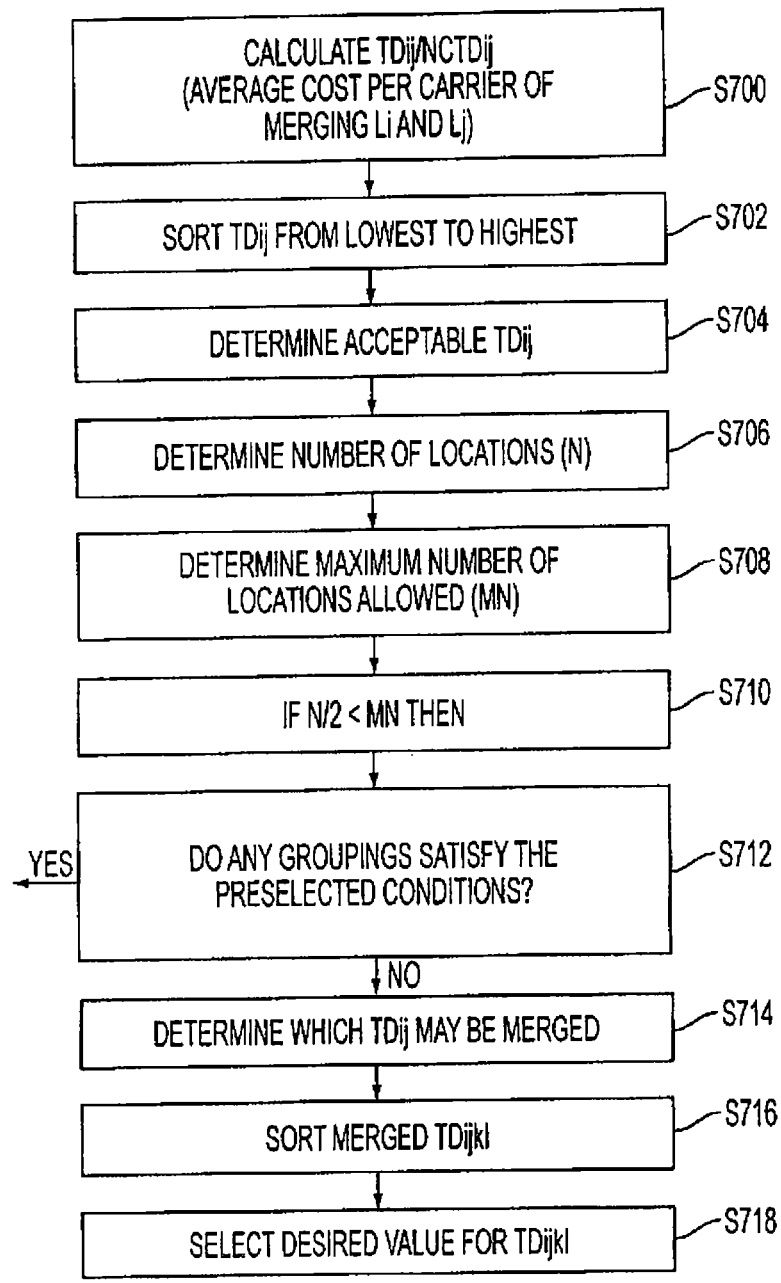
FIG. 7 illustrates exemplary method steps that may be used as part of the merging process.

Using the value for NCTDij, as shown in FIG. 7, the system may calculate the average cost per carrier of merging Li and Lj using the formula: $TD_{ij}/NCTD_{ij}$. As shown in step S702, the values for TDij/NCTDij may be sorted. In this example, the values are sorted from lowest to highest. However, other methods of sorting that may be desirable are also within the scope of the present invention.

The following steps may then be performed recursively. In step S704, an acceptable value for TDij may be determined. When determining an acceptable value for TDij, it may be desirable to account for the capacities of the carriers involved.

Once an acceptable value for TDij has been determined, the number of locations (N) may be calculated in step S706. Of course, this value may be obtained any time before or during the process, as desired. Then, in step S708, using the value determined for N, the system may calculate the maximum number of locations allowed (MN). The maximum number of allowed locations may be based, at least in part, on the number of locations that a switch can handle.

If N/2>MN, then the system may determine in step S712 if there is a set of groupings that satisfy preselected conditions. These preselected conditions may include the following: (1) the resulting number of pairs (or other groups, as may be desired) will cover the entire set of locations; (2) the resulting groups are less than the maximum number of locations; and (3) none of the TDij is above the maximum acceptable value of TDij. If this can be achieved in step S712, the system may end the process.

However, if this cannot be achieved in step S712 (e.g., if TDij would have unacceptable values), the system may determine in step S714 which TDij may be merged. If the resulting number of groups is still larger than the maximum number of locations, the merging process may repeat. In step S716, the merged TDijkl (where k and l are another pair of locations that have been merged) may be sorted. In this non-limiting example, the merged TDijkl may be sorted in ascending order in step S716. Of course, other sorting methods are within the scope of the present invention. Alternatively, the system may not sort, and TDijkl may be selected based on any desired value. The smallest value for TDijkl may then be selected in step S718. The system may then proceed to the steps illustrated in FIG. 8.

Figure 8:
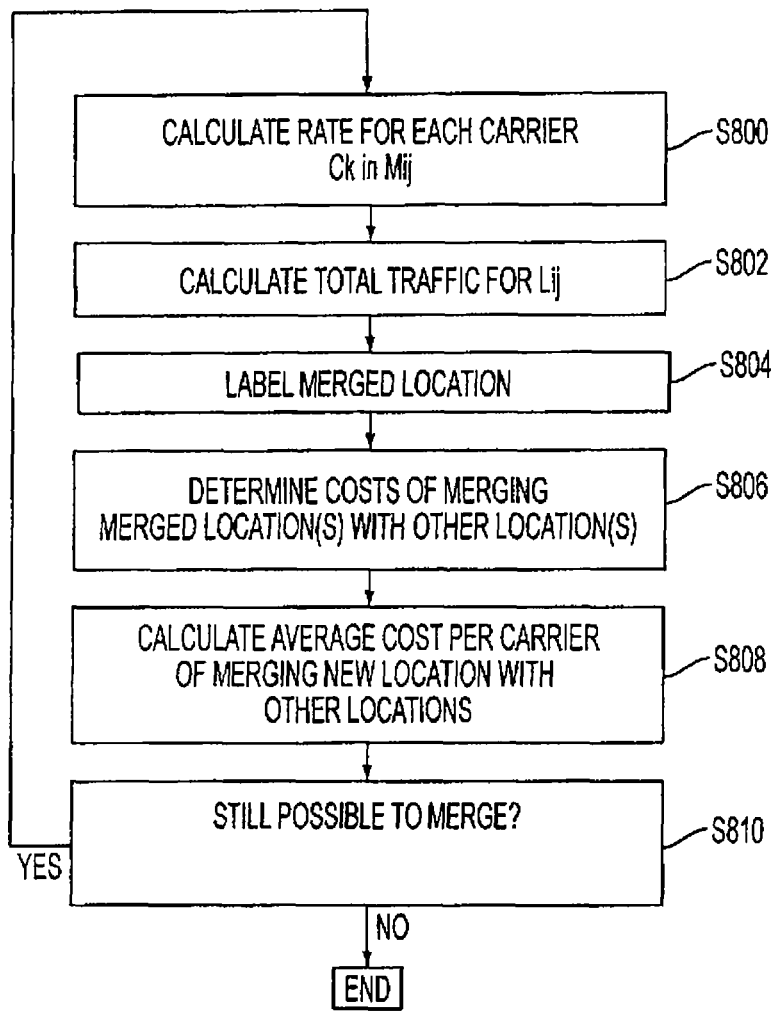
FIG. 8 presents a non-limiting example of a method for recursively merging two locations.

FIG. 8 presents a non-limiting example of a method for recursively merging two locations having desired (e.g., smallest) values for TDij. In step S800, for each carrier Ck in the merged location for Li and Lj (Mij), its rate may be calculated using the formula Max (CRki, CRkj), which is the maximum of the two rates for the carriers for the two locations. In step S802, the system may calculate the total traffic associated with Lij as Ni+Nj (the sum of the traffic to the two locations). In step S804, if not already calculated, the system may calculate the underlying cost (TDij) associated with the merged location.

In step S804, the merged location may be labeled. The labeling process is described in more detail below. In step S806, assuming the merged location is labeled Li, the system may determine the total cost of merging this new location with other locations. This step may account for the cost required to create the location Li (e.g., by adding the TDij for creating the new location Li). In step S808, the system may calculate the average cost per carrier of merging the new Li with other locations (e.g., by dividing the total cost from step S806 by the number of carriers in the merged location). The new location created by the merge may have a number of carriers that is equal to the sum of the distinct carriers from the locations that were used to create the new location.

Steps S800-S808 may be repeated in step S810 until it is no longer possible to merge locations without exceeding the maximum call limit per location (or other "cost") or until there are few enough locations, whichever occurs first. It is also possible to merge multiple locations in a single iteration of calculations. For example, if more than two locations have a cost that does not exceed the threshold, multiple groupings of locations may be merged at the same time—without repeating all of steps S800-S808.

Alternatively, if there are still too many locations, it is possible to increase the maximum number of calls per location. For example, the maximum number of calls may be increased by 10%. Additionally, it is possible to reduce the weight WEij by 5% and/or to increase the weight WCij by 5%. Of course, these percentages are merely exemplary, and any desired percentage may be selected. It may be desirable to increase the limits in smaller increments at first, until the desired conditions are satisfied.

Figure 19:
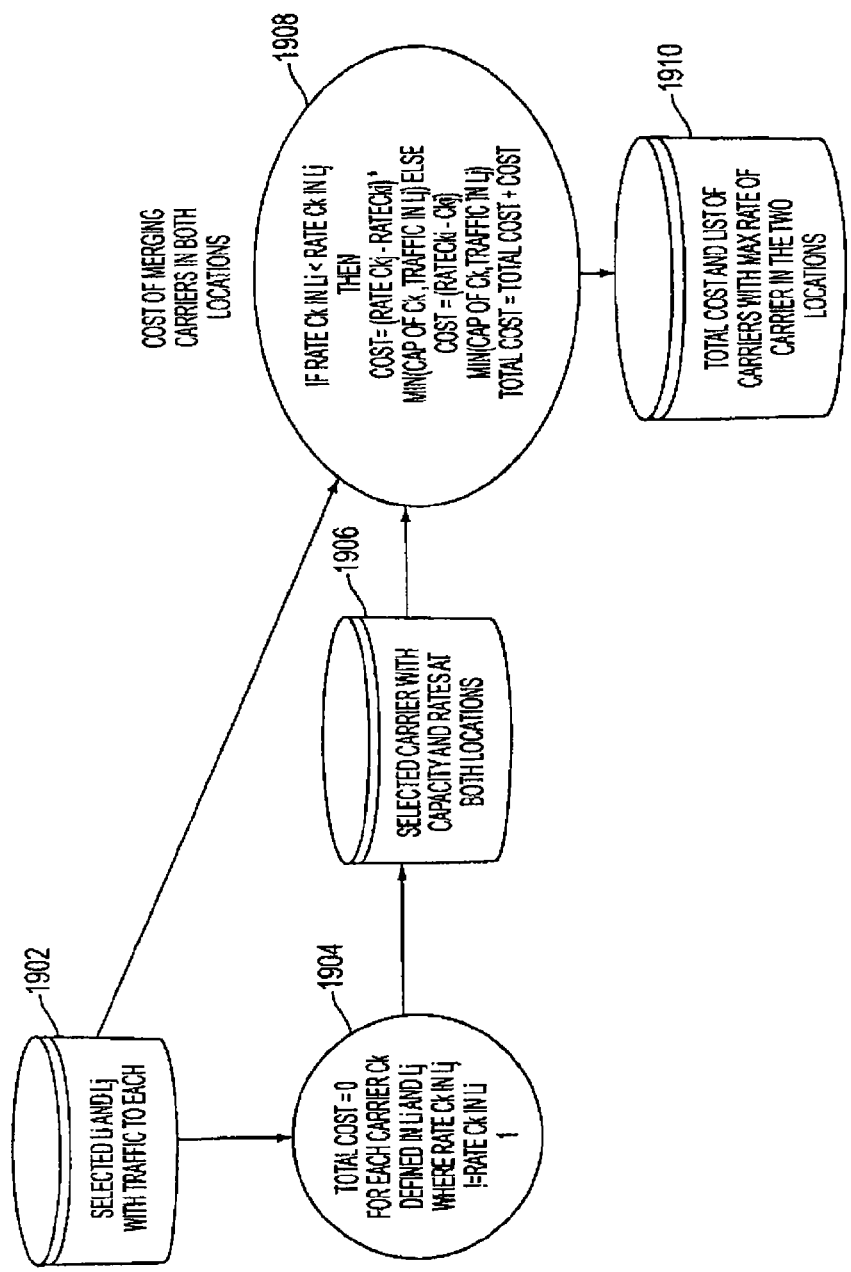
FIG. 19 illustrates a non-limiting example of a system for determining a cost of merging carriers.

FIG. 19 provides yet another non-limiting illustration of a system for determining a cost of merging carriers in two locations. In the example of FIG. 19, two locations (Li, Lj) may be selected in 1902. Then, the total cost of the merge may be zero for each carrier satisfying the parameters of 1904. In 1906, a carrier may be selected with capacity and rates at both locations.

1908 provides an exemplary means for calculating a cost, and 1910 may provide an output of the total cost and a list of carriers with a max rate of the carriers in the locations.

Figure 20:
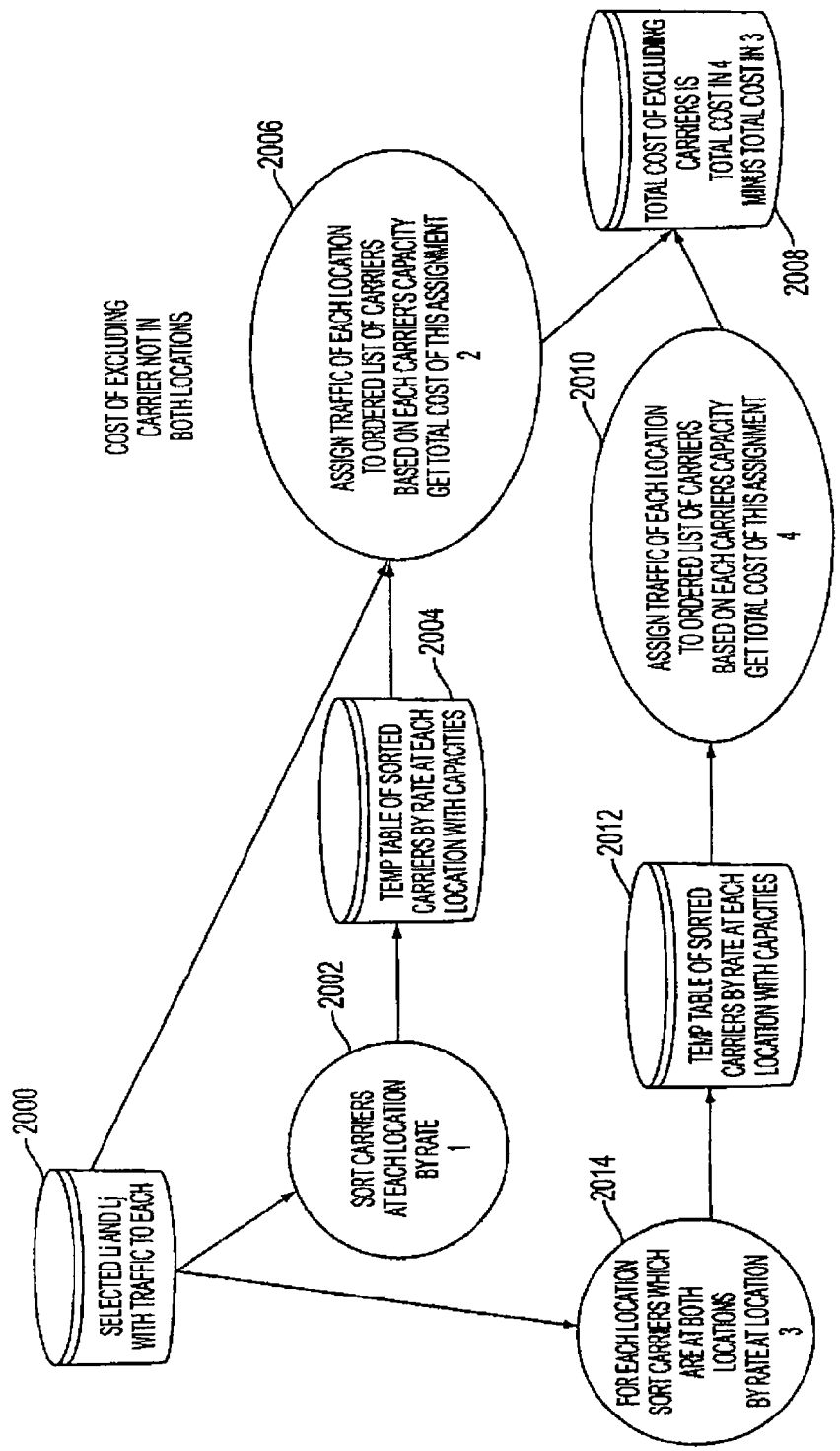
FIG. 20 provides a non-limiting example of a system for calculating a cost of excluding a carrier not in both locations.

As shown in FIG. 20, the system may calculate the cost of excluding a carrier that is not available in both Li and Lj. In 2000, the system may select Li and Lj, each of which may have traffic. In 2002, the carriers may be sorted by rate. In 2004, the system may create a table of
carriers sorted by rate. The table may include information on the capacities of the carriers. In 2006, the system may assign traffic at each location to the ordered list of carriers, accounting for each carrier's capacity. The system may also determine the costs for each of these assignments. In 2014, carriers available at both Li and Lj may be sorted by rate. The system may then create a table of sorted carriers with capacities in 2012, using the information gleaned in 2014. In 2010, the traffic may be assigned to the carriers based on their capacities. The system may also calculate the costs of these assignments. In 2008, the system may determine the total cost of excluding a carrier, which may be calculated by subtracting the value in 2006 from 2010.

Figure 21:
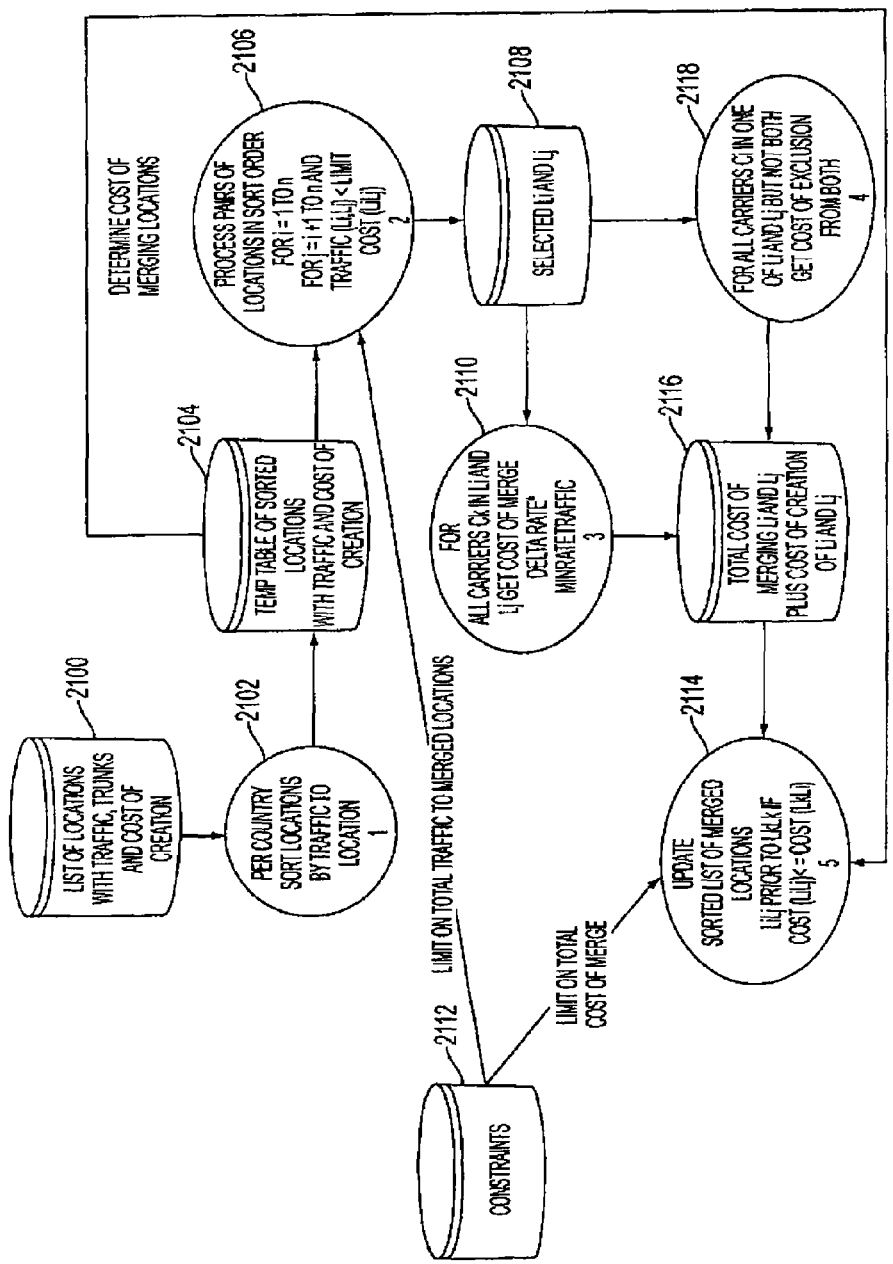
FIG. 21 provides a non-limiting example of a system for determining a cost of merging locations.

FIG. 21 provides another non-limiting example for determining a cost of merging locations. In 2100, the system may obtain a list of locations with traffic, available trunk lines, and costs for creating the location. Exemplary factors that affect the cost of creating a location may include, but are not limited to: the number of locations that a switch can handle, the number of dial strings to a location that a switch can handle, other switch limitations, avoiding creating a location that has minutes beyond carrier capacity in that location, increasing on each iteration of merging the number of minutes allowed to a location, as well as the cost of rates to each location, the difference in rates between locations, and the amount of increase in costs to route calls to the new location when compared to the locations being merged.

In 2102, the system may sort locations by country by traffic to that location, and the system may use that information to create a table in 2104. In 2106, the process may pair locations in sorting order. Constraints 2112, such as a limit on total traffic to merge locations may be considered by the system in 2106. In 2108, Li and Lj may be selected and in 2110, the system gets a cost of the merge. In 2118, for all carriers not in both Li and Lj, the system may obtain a cost for excluding those carriers from the merge. In 2116, the system may obtain the total cost of merging Li and Lj and the cost of creating Li and Lj. In 21 14, the system may update the sorted list of merged locations, considering the constraints 2112.

Figure 22:
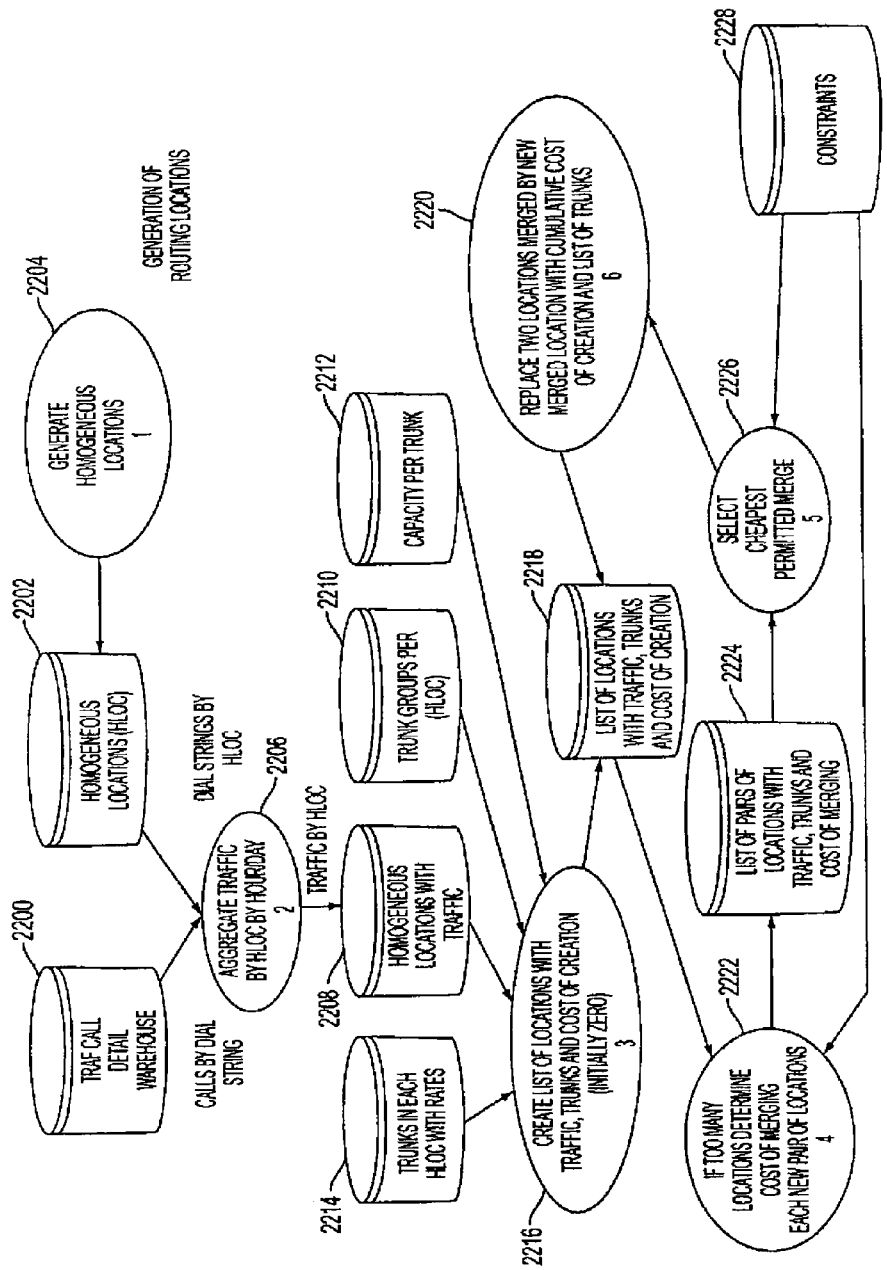
FIG. 22 illustrates a non-limiting example of a system for the generation of routing locations.

FIG. 22 provides yet another non-limiting example according to the present invention. In FIG. 22, the system may reference call history in 2200 to determine traffic, rates, and other relevant information. In 2202, the system may accumulate the homogenous locations (HLOC) generated in 2204. In 2206, the traffic may be aggregated by HLOC. This may be done over a specific time interval, such as by hour or by day. However, a time period is not required.

In 2208, the HLOCs are listed with their respective traffic. In 2210, the trunk groups per HLOC are identified, and the capacity per trunk is identified in 2212, Together with information about the trunks in each HLOC and the associated rates from 2214, a list of locations with traffic, trunks, and cost of creation may be prepared in 2216. That list of locations may be adjusted by the information on merged locations from 2220 to create a list of locations in 2218. In 2222, the system may review the list of locations and may perform a subsequent iteration of the merging process if too many locations remain. When determining if too many locations remain, it may be desirable to consider the capacity of the switches being used for routing. In 2224, the system may compile a list of pairs of locations with traffic, trunks, and costs of merging. In 2226, the cheapest carriers may then be selected for a merge. That information may be incorporated into 2220 for subsequent merging operations. Throughout the entire process, constraints 2228 may be considered where desired.

Although the prior examples discuss parallel calculations, it is possible to do the calculations above in serial. While parallel calculations may be preferable to optimize efficiency, they are not required. Additionally, it is possible to perform multiple iterations of zero cost merges.

The following section provides exemplary pseudocode that may be implemented as an aspect of the present invention. Any available programming language, such as Ablnitio, C++, and/or Delphi, may be used to implement this pseudocode. Additionally, although the following pseudocode includes many aspects of non-limiting embodiments of the present invention, the pseudocode may be modified to include additional features or to remove some of the features described below, as may be desired. It is important to note that the variables described above may be different than the variables described below, as would be understood by those of skill in the art.

Get_Rate_Capacity
Let T be a time interval in minutes;
Get homogeneous routing locations Li;
Obtain dial strings to routing locations Li;
Get rate for each carrier for each dial string;
Merge all carriers that have that dial string;

For each homogeneous routing location Li:
    Get traffic activity Ni to each homogeneous routing location by specified time interval T;
    Get set of carriers Cki available at Li;
    Get rate CRki of carrier Cki at location Li; /may account for standard rate, discount rate, off peak rate, as well as other rates/
    Get capacity CapCk of Cki;
    Get estimate of how much of the capacity can be used at location Li (CPji);
    Get estimate of percent of time a line is used for billable minutes for Cj at location Li (CMji) from historical data;
    Get estimate of billable minutes CMj Cki can take over time interval (CapCk*T*2/3);
End.
Call Get_Costs(0,0)/This may provide initial costs of merging pairs of locations ACDij/
    While Count(Locations>LocLim): /limit on number of locations/
        Sort ACDij in ascending order; /ACDij is the cost of merging locations Li and Li calculated in Get_Costs/
        Set NM(ACDij)=0 for all i j; /neither Li nor Lj has been merged yet/
        Get LocLim (limit on number of locations;
        Get TrafLim (initial limit on traffic to a location);
    While Count(Locations)>LocLim:
        For each ACDij where NM(ACDiJ)=O: /try merging locations which were not yet merged/
            i=Loci (ACDij);
            j=Loc2(ACDij);
            If Ni+Nj<TrafLim;
            Call Merg(Li,Lj); /*Actually merge locations and update*/
        End
    End
    Get Costs(LOC,COST)/*After a pass of merges, update the costs of merging pairs of locations where at least one of the pair was involved in a merge*/
    End;
    Get Costs(LOC,COST)/*The function which initializes merges costs between locations or updates merges between pairs of locations where at least one of the pain was involved in a merge*/
    If LOC=$O_I$
    Then L is the set of all locations;
Else L=LOC; /*set of locations that were impacted by merge in this iteration i.e. if Li and Lj were merged and the result is labeled Lj then Lj will be in Loc/
For each Li in L; /For each location that was modified in a merge/
    For each Lj in current set of locations (i !=j): /for all remaining locations including the ones in Loc/
    NCTDij=number of distinct carriers in Li and Lj combined; /determine the impact of removing a carrier which is in one location and not the other–whatever minutes the carrier would have gotten in the location where it is defined may be shifted down to the available carriers/
    SM=SM+CMki; /the minutes associated with Ck at location Li may be shifted down to more expensive carriers/
    Else if SM>0 and Ck not at capacity;
    CMki=CMki+SM*(CPk–Sum (CMkj))*CMki/um (CMkj) over all locations j; /add a portion of the shifted minutes to carrier Ck's minutes CMki by determining how much excess capacity Ck has and adding a portion of SM to CMki which is proportional to the ratio of Bki of Ck's used minutes sum(Bkj) at all locations Lj. There may be an optional step to update capacity after merge/
    Ni'=Ni'-CMki; /Reduce unassigned minutes by minutes assigned to Ck/
    End. /Now that the traffic has been shifted to carriers which take traffic in both locations, calculate the cost of the merge/
For each carrier Ck available at both Li or Lj: /For each carrier that is in both locations, calculate the penalty when merging—e.g., the cost differential for routing at the higher rate/
    Get rate CRki at location Li and rate CRkj at Lj:
        Dijk=Abs(CRki-CRkj);
        NCki=Min(CMk,Ni);
        NCkj=Min(CMk,Nj);
        If CRki<CRkj then NCkij=NCkj; /Get the minutes to the lower rate location for this carrier. For homogenous locations, this may be calculated using the fast network heuristic techniques. If this is a merged location, then it is possible to use the merged minutes for the carrier from the locations that were merged to create this location./
        Else NCkij=NCki;
        DCijk=Dijk*NCkij; /Get cost differential of routing the minutes to lower rate location using a higher rate/
        CDij=CDij+DCiJk;
    End carrier Ck;
    LOC1(ACDiJ)=i;
    LOC2(ACDij)=j;
End Location Lj;
End Location Li;
Return list of Dij,ACDij;
End Get Costs
Merge(Li,Lj)
    NM(ACDij)=1; /Mark any merge candidate (ACDiI, ACDIj, or other) as not mergeable/
    NM(ACDiI)=1; /since Li and Lj have already been merged into ACDij/
    If Minutes in Li<Minutes in Lj:
        Then label merged location Mij as Li;
        Else Label Mij as Lj;
    As an alternative to If Minutes in Li<Minutes in Lj–If Count(Carriers) in Li<Count(Carriers) in Lj:
        Then label merged location Mij as Li;
        Else label Mij as Lj; /Can label based on any preference/
    For each carrier Ck in both Li and Lj:
        CMkj=CMki+CMkj; /The minutes to each carrier in the merged location is the sum of the minutes to the carrier in each of the locations/
    End
End
The following may also be used as an alternative:
If there are carriers Ck which are available at only one of Li and Lj:
    Si=carriers at Li sorted by rates in ascending order;
    Ni'=Ni;
    Costi=0;
    While Ni'>0:
        Get next carrier Ck in Si;
        Ni'=Ni'-CMk;
        Costi=Costi+CMk*Rk;
    End
    NSi=Si without carriers which are to be excluded be merged;
    Ni'=Ni;
    NCosti=0;

While Ni'>0:
  Get next carrier Ck in NSi;
  Ni'=Ni'-CMk;
  NCosti=NCosti+CMk*Rk;
End;
Pi=NCosti−Costi;
Repeat to get Pj;
Eij=Pi+Pj;
ACDij=(WCij*(CDij+COST)+Wpij*Eij)/NCTDij;
End.

Figure 9A:
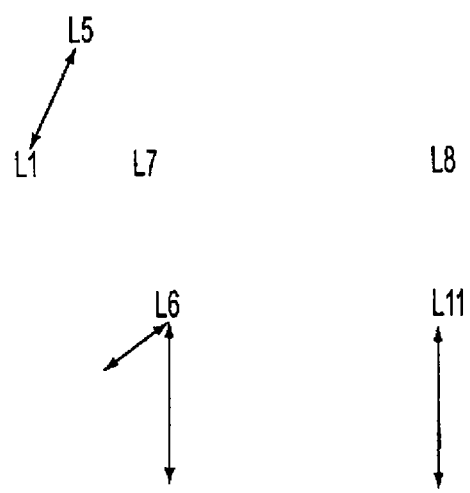
FIGS. 9A and 9B illustrate an exemplary tree according to a non-limiting aspect of the present invention.
Figure 9B:
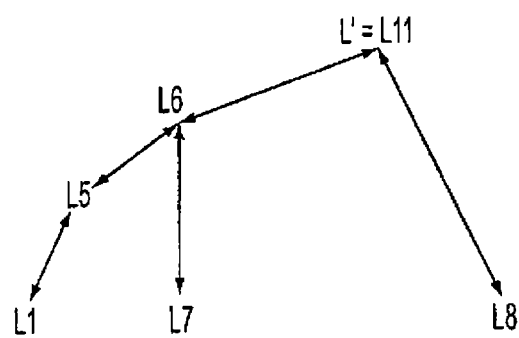

To avoid repeatedly relabeling routing locations with each merge, a tree structure may be recursively built for the merged locations. Each merge may then be a redirect of the root of one tree to point to the root of another, as shown in FIGS. 9A and 9B.

In the foregoing non-limiting examples, the rate and carrier information is based upon a multi-day aggregation of data. A multi-day time period is useful because of slower refresh rates among switches.

However, as switches continue to improve, the refresh rate increases. In such cases, it may be desirable to use a more granular view of traffic. For example, it may be desirable to optimize merging based on time of day rate changes or the ability to change routing locations on demand (e.g., hourly or otherwise). Where time of day rate changes are used in the calculations, it may be possible to consider a location homogeneous for a set of carriers if each of the carriers in that location has, for all dial strings in the location, the same time of day rate for each hour of the week.

Typically, if the locations are being generated on an hourly basis, it may be beneficial to obtain an average over a preceding amount of time. For example, it might be desirable to take an average of the rates and/or traffic occurring at a given day/time to obtain a historical estimate of the average rates and/or traffic.

A ratio may be created by the using the prior hour's traffic divided by the prior hour historical traffic. This ratio may then be multiplied against the current hour's historical traffic to obtain an estimate of the current hour's anticipated traffic. Techniques for these types of monitoring activities are disclosed in co-pending application Ser. No. 11/024,672, the contents of which are herein incorporated by reference.

Figure 10:
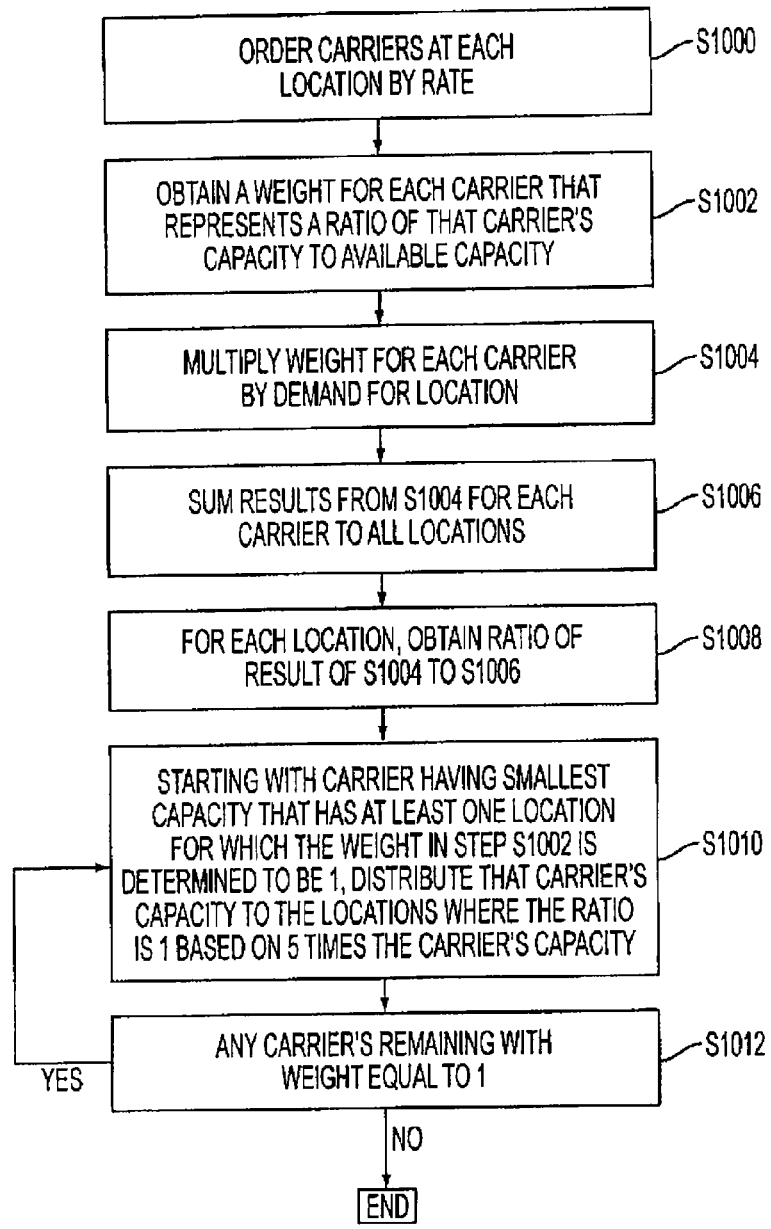
FIG. 10 provides a non-limiting example of a method for weighting and sorting carriers according to an aspect of the present invention.

FIG. 10 illustrates an exemplary method for apportioning traffic according to a non-limiting aspect of the present invention. As shown in FIG. 10, the method may begin in step S1000 with ordering the carriers at each location by rate. For example, the carriers may be sorted in ascending order, with the lowest rate carrier first. The result of this ordering is shown in FIG. 12. Next, in step S1002, the system may obtain a weight for each carrier that represents a ratio of that carrier's capacity to the available capacity. By way of non-limiting example, if the first carrier in the rate order has a capacity of 100 and the second carrier has a capacity of 80, then the first would have a ratio of 1 and the second would have a ratio of 80/180. In other words the ratio represents that carrier's capacity in the ranking order relative to the total capacity of all carriers prior to and including that carrier in the ranking order.

Subsequently, in step S1004, the weight for each carrier may be multiplied by the demand at each location. Examples of the results of these calculations are illustrated in FIG. 11.

The results of step S1004 are then summed for each carrier in step S1006. In step S1008, the ratio of the results of S1004 to S1006 is obtained for each location. An example of the result of step S1008 is illustrated in FIG. 13.

In step S1010, the system may distribute a carrier's capacity to the locations where the ratio for that carrier is 1 (based on 5 times the carrier's capacity). This process may begin with the carrier having the smallest capacity that has at least one location for which that carrier has a ratio of 1. Example results from step S1010 are shown in FIG. 14. Step S1012 illustrates that the system may repeat step S1010 until all carriers having a weight of 1 have been processed. After all such carriers have been processed, the system may end this process.

The table set forth in FIG. 14 represents a distribution of the capacity of each carrier at each location. In other words, FIG. 14 illustrates the capacity of carriers as a function of demand to a location.

Once demand has been distributed, the demand assigned to each carrier may be summed to find the total traffic in FIG. 15. In simple terms, the numbers in FIG. 15 represent the demand assigned to each carrier at the location to be merged, relative to the demand to that carrier over all locations multiplied by all of the demand assigned to that carrier at all locations. This helps to determine how much demand remains that has not been used or assigned.

FIG. 15 shows the carriers from FIG. 12, which were ordered from cheapest to most expensive, with traffic being apportioned to the cheapest carriers first. The apportionments in FIG. 15 may be subtracted from the total demand to all locations.

In FIG. 16, the system may calculate the updated demand divided by the total places where that carrier is placed first or second in the order of preference of assignment. In this example, this calculation is representative of WCij being less than or equal to 2. In FIG. 16, the values obtained in FIG. 13 are combined with the rates from FIG. 11.

In this example, WCij is changing to represent different preferences for carriers. For example, when WCij is set equal to 1, the system only chooses carriers ranked first (e.g., in the first iteration, only first ranked carriers may be selected). When WCij is increased, carriers in lower tiers may be selected.

In the following discussion of FIG. 17, the values for i and j are different than in the prior figures. In FIG. 17, i represents a carrier, while j represents a location where that carrier i is available.

In FIG. 12, carrier C3 was ordered first, carrier C2 was ordered second, and carrier C1 was ordered third. In FIG. 13, carrier C3 had a ratio of 1 because it had a capacity of 60, which was the top capacity in FIG. 11. To generate a weighted average cost per available capacity at that location, the rates for each carrier are multiplied by their respective capacities. That number is then divided by the total capacity, thereby generating a weighted average cost (ACL) per available capacity at that location. In some places, the weighted average cost may be less than at others.

In FIG. 17, AvgCiW, the weighted average over all locations for a given carrier, is obtained by multiplying the weighted average to that location by the demand divided by all locations where that carrier is getting traffic.

FIG. 18 represents the ratio at location divided by total weighted demand. In this non-limiting example, the terms Total CiW and CiW are used interchangeably. In this example, the system starts with the highest Dij until the total capacity is filled. The values 60, 40, 90, 50 were obtained from FIG. 13. In this example, the demand may be apportioned such that carrier C1 does not receive all of the available traffic, and the traffic may be apportioned according to the earlier calculated ratios. However, this method of calculation may not be optimal, as the least preferred carrier may receive more traffic than is desirable. Accordingly, other methods of calculating demand distribution are within the scope of this invention.

Figure 23:
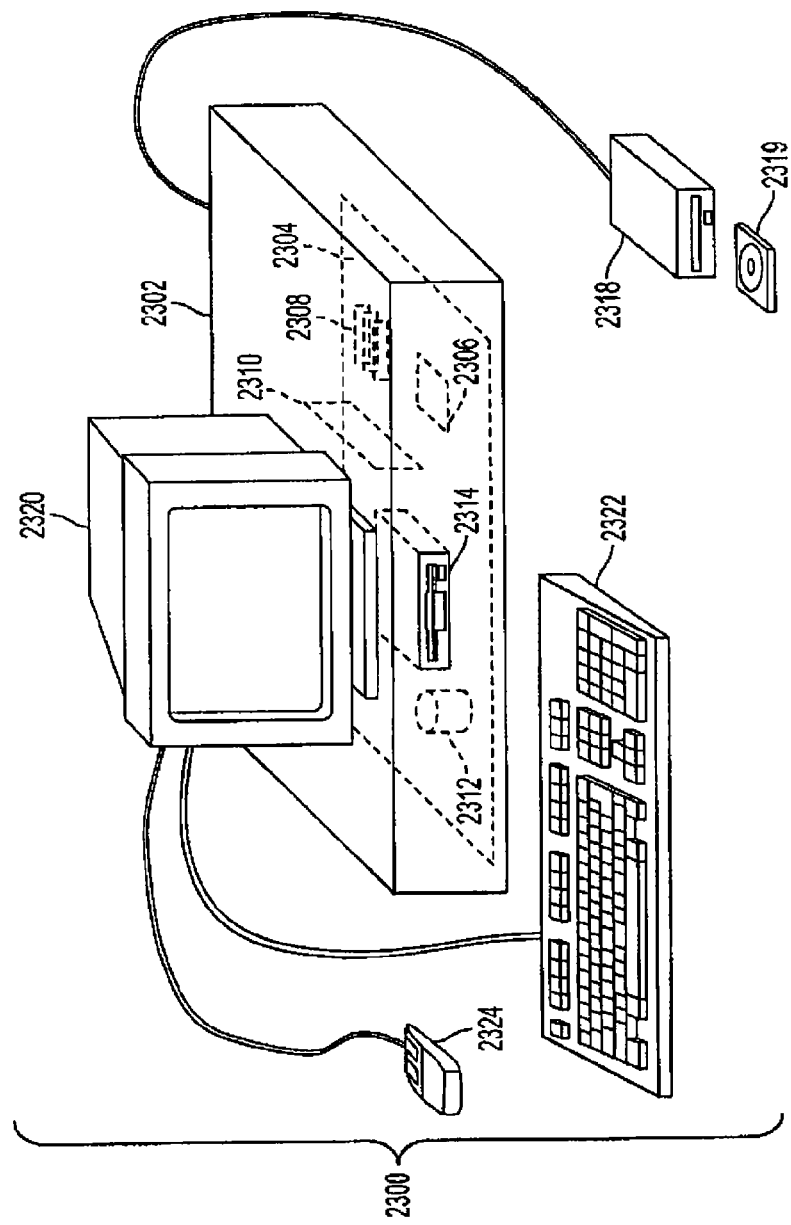
FIG. 23 represents a non-limiting example of architecture that may be used to implement the present invention.

FIG. 23 is a schematic illustration of a computer system for performing at least one of the functions of FIG. 1. A computer 2300 implements the method of the present invention, wherein the computer housing 2302 houses a motherboard 2304 which contains a CPU 2306, memory 2308 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 2300 also includes plural input devices, (e.g., a keyboard 2322 and mouse 2324), and a display card 2310 for controlling monitor 2320. In addition, the computer system 2300 further includes a floppy disk drive 2314; other removable media devices (e.g., compact disc 2319, tape, and removable magneto-optical media (not shown)); and a hard disk 2312, or other fixed, high density media drives, connected using an appropriate device bus (e.g., a SCSI bus, an Enhanced IDE bus, or a Ultra DMA bus). Also connected to the same device bus or another device bus, the computer 2300 may additionally include a compact disc reader 2318, a compact disc reader/writer unit (not shown) or a compact disc jukebox (not shown). Although compact disc 2319 is shown in a CD caddy, the compact disc 2319 can be inserted directly into CD-ROM drives which do not require caddies. In addition, a printer (not shown) may provide printouts, if desired.

As stated above, the system may include at least one computer readable medium. Examples of computer readable media are compact discs 2319, hard disks 2312, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 2300 and for enabling the computer 2300 to interact with a human user. Such software may include, but is not limited to, device drivers, operating systems and user applications, such as development tools. Together, the computer readable media and the software thereon form a computer program product of the present invention for performing at least one of the functions of FIG. 1. The computer code devices of the present invention can be any interpreted or executable code mechanism, including but not limited to scripts, interpreters, dynamic link libraries, Java classes,
and complete executable programs. For example, the application 2390 may be a web interface that queries the database 2380 and/or controls one of the switches.

The present invention may also use a web application server, which implements a user interface. A database server including information for comparing actual link performance with thresholds, as well as network databases that aggregate and process the link performance data. The present invention may further include an interface between the link monitoring system and a business criteria database or engine, to aid the system in determining compliance with the predetermined business criteria. The web application server may be connected (e.g., via a local area network (LAN) or other suitable architecture) to operator consoles that enable execution of the method of the present invention.

The information used to determine the desirability of merging may be stored in various databases (not pictured). For example, the rates of the available carriers may be associated with the respective carriers in a rates database. Similarly, the carriers that travel to a location may be stored in a database associated with that location. Additionally, various types of carrier information may be stored in databases, as shown in co-pending application Ser. No. 11/024,672. Of course, these examples are non-limiting, and other associations and/or database structures are within the scope of the present invention.

Additionally, although the aspects above were described with reference to national routing, it is also possible to use the present invention in international routing.

Additional advantages and modifications will readily occur to those skilled in the art. Therefore, the invention in its broader aspects is not limited to the specific details and representative embodiments shown and described herein. Accordingly, various modifications
may be made without departing from the spirit or scope of the general inventive concept as defined by the appended claims and their equivalents.

What is claimed is:
1. A method for merging locations, comprising:
   calculating a first characteristic of at least one carrier at a first location and a second location;
   determining a first penalty for excluding said carrier based at least in part on said first characteristic;
   comparing said first penalty to a first preselected value;
   merging said first location and said second location if said first penalty is less than said first preselected value, thereby forming a first merged location;
   if said first penalty is not less than said first preselected value
   calculating a second characteristic of said carrier at a third location and at a fourth location;
   determining a second penalty for excluding said carrier based at least in part on said second characteristic;
   comparing said second penalty to said first penalty; and
   if said second penalty is less than said first penalty, merging said third location with said fourth location, or
   if said second penalty is greater than said first penalty merging said first location with said second location, or
   if said first penalty and said second penalty are the same creating a bias favoring said first merged location if said first merged location had been previously created,
   and repeating said calculating, said determining, said comparing, and said merging for one or more additional locations until a number of locations is less than a predetermined threshold.

2. The method according to claim 1, wherein said carrier is one of a plurality of carriers.

3. The method according to claim 2, further comprising assigning a demand to said carrier based at least in part on said characteristic.

4. The method according to claim 3,
   wherein said carrier is a first carrier, and
   wherein said method further comprises determining an amount of said demand that would be assigned to a second carrier of said plurality of carriers if said first carrier were excluded.

5. The method according to claim 1, wherein said characteristic includes at least one of a capacity, a rate, a demand, a call quality, or a business criteria.

6. The method according to claim 1, wherein said determining is based at least in part on a number of minutes associated with said carrier.

7. The method according to claim 1, wherein said penalty is one of a plurality of penalties.

8. The method according to claim 1, further comprising determining if said carrier is not available at said second location.

9. The method according to claim 1, further comprising merging said first merged location with said second merged location.

10. The method according to claim 1, wherein said second preselected value is equal to said first preselected value.

11. The method according to claim 1, further comprising creating a bias favoring said second merged location if said second merged location had been previously created.

12. The method according to claim 1, wherein said first location and said second location are within a Local Access Transport Area (LATA).

13. The method according to claim 1, wherein said first location and said second location are homogenous locations.

14. The method according to claim 1, wherein the predetermined threshold is based at least in part on a capacity of a switch.

15. A system for merging locations, comprising:
a processing unit; and
a memory that contains a program that controls said processing unit to perform operations of:
calculating a first characteristic of a carrier at a first location and a second location;
determining a first penalty for excluding said carrier based at least in part on said first characteristic;
comparing said first penalty to a first preselected value;
merging said first location and said second location if said first penalty is less than said first preselected value, thereby creating a first merged location;
if said first penalty is not less than said first preselected value,
calculating a second characteristic of said carrier at a third location and at a fourth location;
determining a second penalty for excluding said carrier based at least in part on said second characteristic;
comparing said second penalty to said first penalty; and
if said second penalty is less than said first penalty, merging said third location with said fourth location, or
if said second penalty is greater than said first penalty merging said first location with said second location, or
if said first penalty and said second penalty are the same creating a bias favoring said first merged location if said first merged location had been previously created,
and repeating said calculating, said determining, said comparing, and said merging for one or more additional locations until a number of locations is less than a predetermined threshold.

16. The system according to claim 15, wherein said carrier is one of a plurality of carriers.

17. The system according to claim 16, wherein said program also controls said processing unit to perform an operation of assigning a demand to said carrier based at least in part on said characteristic.

18. The system according to claim 17,
wherein said carrier is a first carrier, and
wherein said program also controls said processing unit to perform an operation of determining an amount of said demand that would be assigned to a second carrier of said plurality of carriers if said first carrier were excluded.

19. The system according to claim 15, wherein said characteristic includes at least one of a capacity, a rate, a demand, a call quality, or a business criteria.

20. The system according to claim 15, wherein said determining makes a determination based at least in part on a number of minutes associated with said carrier.

21. The system according to claim 15, wherein said penalty is one of a plurality of penalties.

22. The system according to claim 15, wherein said program also controls said processing unit to perform an operation of determining if said carrier is not available at said second location.

23. The system according to claim 15, wherein said first location and said second location are within a Local Access Transport Area (LATA).

24. The system according to claim 15, wherein said first location and said second location are homogenous locations.

* * * * *